United States Patent
Tsai

(10) Patent No.: US 9,713,128 B2
(45) Date of Patent: Jul. 18, 2017

(54) HANDHELD DEVICE, BASE STATION AND TRANSMISSION CONTROL METHOD THEREOF

(71) Applicant: MEDIATEK INC., Hsinchu (TW)

(72) Inventor: Jeng-Yi Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 441 days.

(21) Appl. No.: 14/538,071

(22) Filed: Nov. 11, 2014

(65) Prior Publication Data

US 2015/0131626 A1 May 14, 2015

Related U.S. Application Data

(60) Provisional application No. 61/902,426, filed on Nov. 11, 2013, provisional application No. 61/931,088, filed on Jan. 24, 2014, provisional application No. 61/931,087, filed on Jan. 24, 2014.

(51) Int. Cl.
*H04W 72/04* (2009.01)
*H04L 1/00* (2006.01)
*H04L 1/18* (2006.01)
*H04L 5/00* (2006.01)

(52) U.S. Cl.
CPC ......... *H04W 72/0413* (2013.01); *H04L 1/008* (2013.01); *H04L 1/0083* (2013.01); *H04L 1/0091* (2013.01); *H04L 1/1829* (2013.01); *H04L 5/0055* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2013/0329701 A1* | 12/2013 | Bajzec | H04L 1/1887 370/336 |
| 2013/0343273 A1* | 12/2013 | Barbieri | H04L 1/1822 370/328 |
| 2014/0003374 A1* | 1/2014 | Kuo | H04L 1/1896 370/329 |
| 2015/0049690 A1* | 2/2015 | Sambhwani | H04L 1/0053 370/329 |
| 2015/0223237 A1* | 8/2015 | Sambhwani | H04L 1/08 370/336 |

(Continued)

OTHER PUBLICATIONS

3rd Generation Partnership Project "Technical Specification Group Radio Access Network; Study on Dedicated Channel (DCH) enhancements for UMTS (Release 12)", Sep. 2013.*

(Continued)

*Primary Examiner* — Robert M Morlan
(74) *Attorney, Agent, or Firm* — McClure, Qualey & Rodack, LLP

(57) ABSTRACT

A handheld device, a base station and transmission control methods thereof are provided. The handheld device transmits an uplink signal to the base station with an uplink dedicated physical control channel (UL DPCCH) carrying both transport format combination indicator (TFCI) code word and acknowledgement (ACK) information. The base station terminates a downlink signal transmission to the handheld device in response to the ACK information.

20 Claims, 16 Drawing Sheets

(56) References Cited

U.S. PATENT DOCUMENTS

2015/0271816 A1* 9/2015 Akkarakaran .... H04W 72/0446
370/336

OTHER PUBLICATIONS

ZTE: "uplink ACK channel design for DL FET", 3GPP Draft; R1-135619_Uplink ACK Indication for DL FET, 3rd Generation Partnership Project (3GPP), Mobile Competence Centre; 650, Route Des Lucioles; F-06921 Sophia-Antipolis Cedex; France; Nov. 11-15, 2013.

Mediatek Inc: "TP on simulation assumptions and DCH enhancements", 3GPP Draft; R1-131695_TP on Simulation Assumptions and DCH Enhancements, 3rd Generation Partnership Project (3GPP), Mobile Competence Centre; 650, Route Des Lucioles; F-06921 Sophia-Antipolis Cedex; Apr. 15-19, 2013.

Mediatek Inc: "TP on DCH enhancements", 3GPP Draft; R1-133298_TP_on_DCH_Enhancements, 3rd Generation Partnership Project (3GPP), Mobile Competence Centre; 650, Route Des Lucioles; F-06921 Sophia-Antipolis Cedex; France; Aug. 19-23, 2013.

Qualcomm Incorporated: "remaining aspects of DCH enhancements", 3GPP Draft; R1-142460 Remaining DCH Aspects, 3rd Generation Partnership Project (3GPP), Mobile Competence Centre; 650, Route Des Lucioles; F-06921 Sophia-Antipolis Cedex; France; May 19-23, 2014.

Extended European Search Report for corresponding European Patent application No. 14192628.7 rendered on Mar. 19, 2015.

* cited by examiner

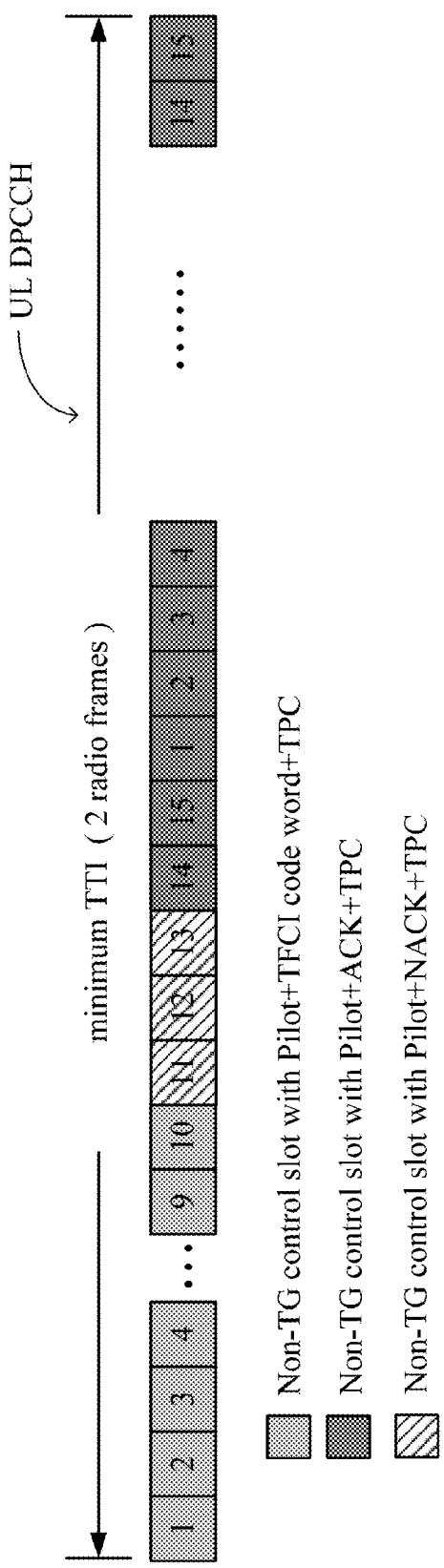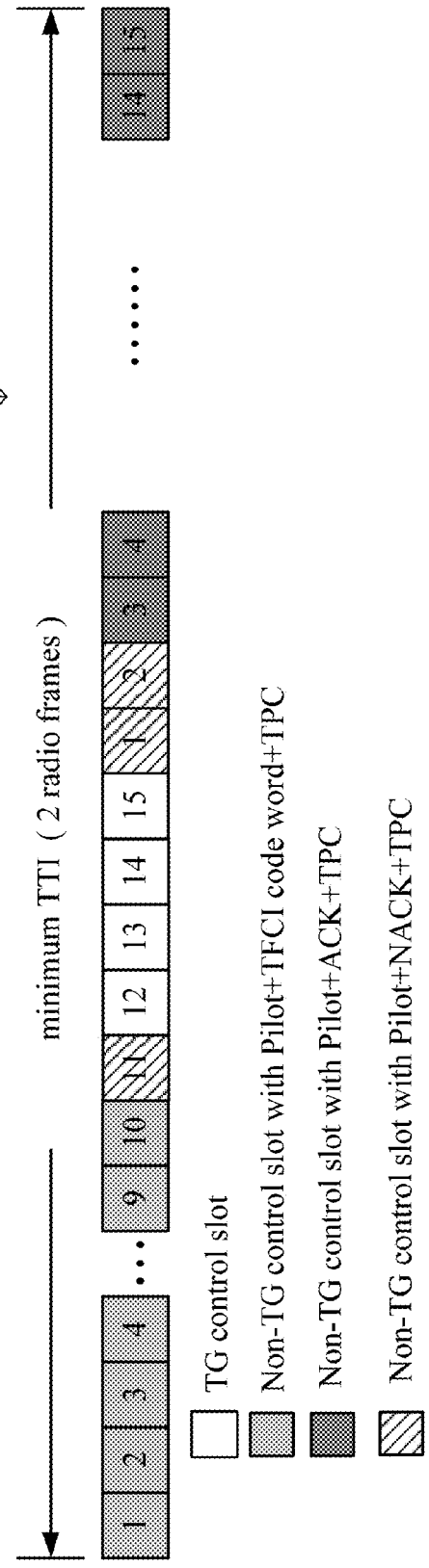

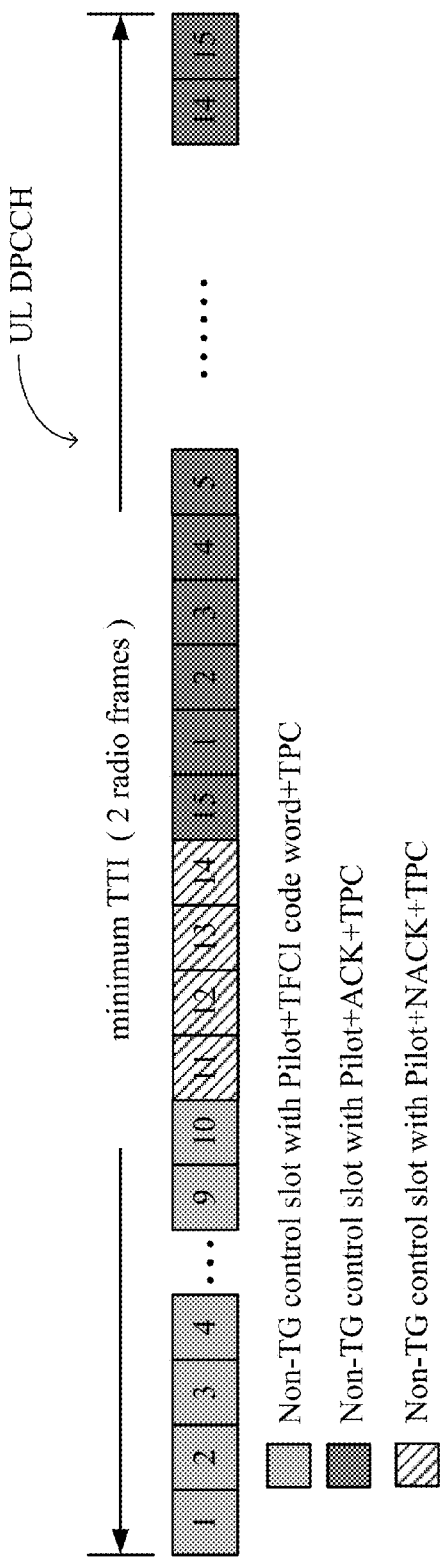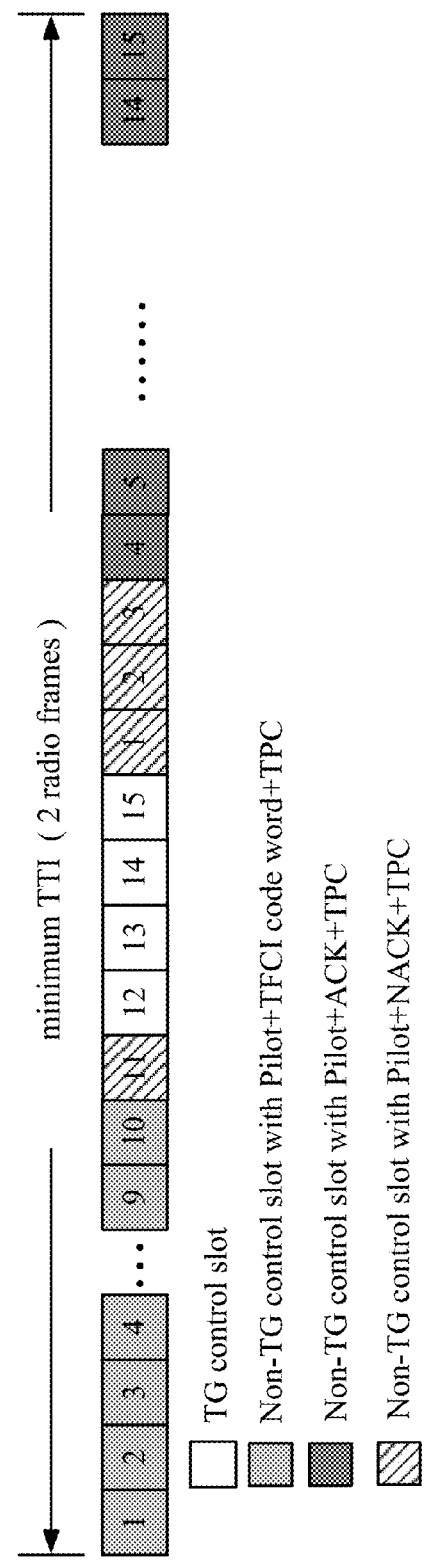
FIG. 6A
FIG. 6B

HANDHELD DEVICE, BASE STATION AND TRANSMISSION CONTROL METHOD THEREOF

This application claims the benefit of priority based on U.S. Provisional Application Ser. Nos. 61/902,426 filed on Nov. 11, 2013, 61/931,088 filed on Jan. 24, 2014 and 61/931,087 filed on Jan. 24, 2014, which are hereby incorporated by reference in their entireties.

CROSS-REFERENCES TO RELATED APPLICATIONS

Not applicable.

BACKGROUND OF THE INVENTION

Field of the Invention

The present invention relates to a handheld device, a base station and transmission control methods thereof. More particularly, the handheld device of the present invention transmits an uplink signal with an uplink dedicated physical control channel (UL DPCCH) to a base station and utilizes parts of the TFCI fields of the UL DPCCH to carry acknowledgement (ACK) information for downlink data frame early termination.

Descriptions of the Related Art

With the development of wireless communication technologies, wireless devices have been widely used. To satisfy users' demands for communication, various telecommunication standards have been developed. Universal mobile telecommunications system frequency division duplex (UMTS-FDD) Release 99 is a version of the third generation (3G) communication system. The UMTS-FDD Release 99 provides circuit-switched speech services in which a circuit-switched connection is established between a user device and a base station. User data and physical layer control information are carried on dedicated physical channels (DPCHs) of the uplink signal and the downlink signal, and the uplink signal and the downlink signal are respectively transmitted in different frequency bands at the same time.

FIG. 1A is a schematic diagram of the uplink signal in a radio frame with 15 slots as defined in the UMTS-FDD Release 99 specification. The DPCH of the uplink signal includes a dedicated physical data channel (DPDCH) carrying the user data and a dedicated physical control channel (DPCCH) carrying physical layer control information. In each slot, the DPCCH comprises a pilot field, a transport format combination indication (TFCI) field, a feedback indication (FBI) field and a transmit power control (TPC) field. In addition, the minimum transmission time interval (minimum TTI) defined in the UMTS-FDD Release 99 specification may be one, two or four radio frames. In the case that the minimum TTI is two or four radio frames, the first 30 bits of the TFCI code word are repeatedly carried in each radio frame in the minimum TTI. For example, FIG. 1B depicts the repeated TFCI code word where the minimum TTI is two radio frames.

Furthermore, in the UMTS-FDD Release 99 system, the downlink data frame of the downlink signal simultaneously received by the user device is encoded with an appropriate code rate. In such a case, the encoded downlink data frame may be successfully decoded by the user device without the need of thoroughly receiving the whole downlink data frame within the minimum TTI. Thus, the remaining part of the downlink data frame may not have to be received by the user device and transmitted by the base station. In view of the aforesaid, the current transmission mechanism in UMTS-FDD Release 99 system likely has unnecessary power consumption in the base station. In addition, the base station cannot be immediately informed if the downlink data frame has been successfully and early decoded. As a result, the base station cannot terminate the transmission of the downlink data frame, reallocate the transmission power of different downlink signals for multiple user devices and reduce the interference among the downlink signals.

Accordingly, it is important to provide a transmission mechanism which can immediately inform the base station that the downlink data frame of the downlink signal has been successfully and early decoded to make the base station capable of terminating the transmission of the downlink data frame, reallocating the transmission power of different downlink signals for multiple user devices and reducing the interference among the downlink signals.

SUMMARY OF THE INVENTION

The objective of the present invention is to provide a transmission control mechanism in which the user device uses the TFCI fields of the UL DPCCH to immediately inform the base station that the downlink data frame of the downlink signal has been successfully and early decoded once the received part of the downlink data frame has enough to be successfully decoded. As a result, with the transmission control mechanism of the present invention, the base station can terminate the transmission of the downlink data frame in time to prevent unnecessary power consumption, reallocate the transmission power of different downlink signals for multiple user devices and reduce the interference among the downlink signals.

To achieve the aforesaid objective, the present invention discloses a handheld device which comprises a processor and a transceiver. The processor is configured to generate an uplink signal. The transceiver is electrically connected to the processor and configured to transmit the uplink signal to a base station. The uplink signal has an uplink dedicated physical control channel (UL DPCCH). The UL DPCCH comprises a plurality of non-transmission gap (non-TG) control slots in a minimum transmission time interval (TTI). Each of the non-TG control slots has a transport format combination indicator (TFCI) field. For each minimum TTI, the TFCI fields of first 10 non-TG control slots of the non-TG control slots carry a TFCI code word, while the TFCI fields of remaining non-TG control slots of the non-TG control slots carry acknowledgement (ACK) information for downlink data frame early termination.

In addition, the present invention further discloses a transmission control method for use in a handheld device. The handheld device comprises a processor and a transceiver. The transceiver is electrically connected to the processor. The transmission control method comprises the following steps: (a) generating, by the processor, an uplink signal; and (b) transmitting, by the transceiver, the uplink signal to a base station. The uplink signal has an uplink dedicated physical control channel (UL DPCCH), while the UL DPCCH comprises a plurality of non-transmission gap (non-TG) control slots in a minimum transmission time interval (TTI). Each of the non-TG control slots has a transport format combination indicator (TFCI) field. For each minimum TTI, the TFCI fields of first 10 non-TG control slots of the non-TG control slots carry a TFCI code word, while the TFCI fields of remaining non-TG control slots of the non-TG control slots carry acknowledgement (ACK) information for downlink data frame early termination.

To achieve the aforesaid objective, the present invention further discloses a base station which comprises a transceiver and a processor. The transceiver is configured to transmit a downlink signal to a handheld device and receive an uplink signal from the handheld device. The uplink signal has an uplink dedicated physical control channel (UL DPCCH), while the UL DPCCH comprises a plurality of non-transmission gap (non-TG) control slots in a minimum transmission time interval (TTI). Each of the non-TG control slots has a transport format combination indicator (TFCI) field. For each minimum TTI, the TFCI fields of first 10 non-TG control slots of the non-TG control slots carry a TFCI code word, while the TFCI fields of remaining non-TG control slots of the non-TG control slots carry acknowledgement (ACK) information for downlink data frame early termination. The processor is electrically connected to the transceiver and configured to generate the downlink signal and enable the transceiver to terminate transmission of a downlink data frame of the downlink signal according to the ACK information.

Moreover, the present invention further discloses a transmission control method for use in a base station. The base station comprises a transceiver and a processor. The transceiver is electrically connected to the processor. The transmission control method comprises the following steps: (a) the processor generates a downlink signal; (b) the transceiver transmits the downlink signal to a handheld device; (c) the transceiver receives an uplink signal from the handheld device; and (d) the transceiver terminates transmission of a downlink data frame of the downlink signal according to acknowledgement (ACK) information carried in the uplink signal. The uplink signal has an uplink dedicated physical control channel (UL DPCCH), while the UL DPCCH comprises a plurality of non-transmission control gap (non-TG) slots in a minimum transmission time interval (TTI). Each of the non-TG control slots has a transport format combination indicator (TFCI) field. For each minimum TTI, the TFCI fields of first 10 non-TG control slots of the non-TG control slots carry a TFCI code word, while the TFCI fields of remaining non-TG control slots of the non-TG control slots carry the ACK information for downlink data frame early termination.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 5A is a schematic view showing a slot structure of the UL DPCCH in the normal mode according to the second embodiment of the present invention;

FIG. 5B is a schematic view showing a slot structure of the UL DPCCH with TG control slots in the compressed mode according to the second embodiment of the present invention;

FIG. 6A is a schematic view showing a slot structure of the UL DPCCH in the normal mode according to the third embodiment of the present invention;

FIG. 6B is a schematic view showing a slot structure of the UL DPCCH with TG control slots in the compressed mode according to the third embodiment of the present invention;

DESCRIPTION OF THE PREFERRED EMBODIMENT

The present invention provides a handheld device, a base station and transmission control methods thereof. In the following description, the present invention will be explained with reference to embodiments thereof. It shall be appreciated that theses embodiments of the present invention are not intended to limit the present invention to any specific environment, applications or implementations described in these embodiments. Therefore, the description of these embodiments is only for purpose of illustration rather than to limit the present invention and the scope claimed in this application shall be governed by the claims. Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1A:
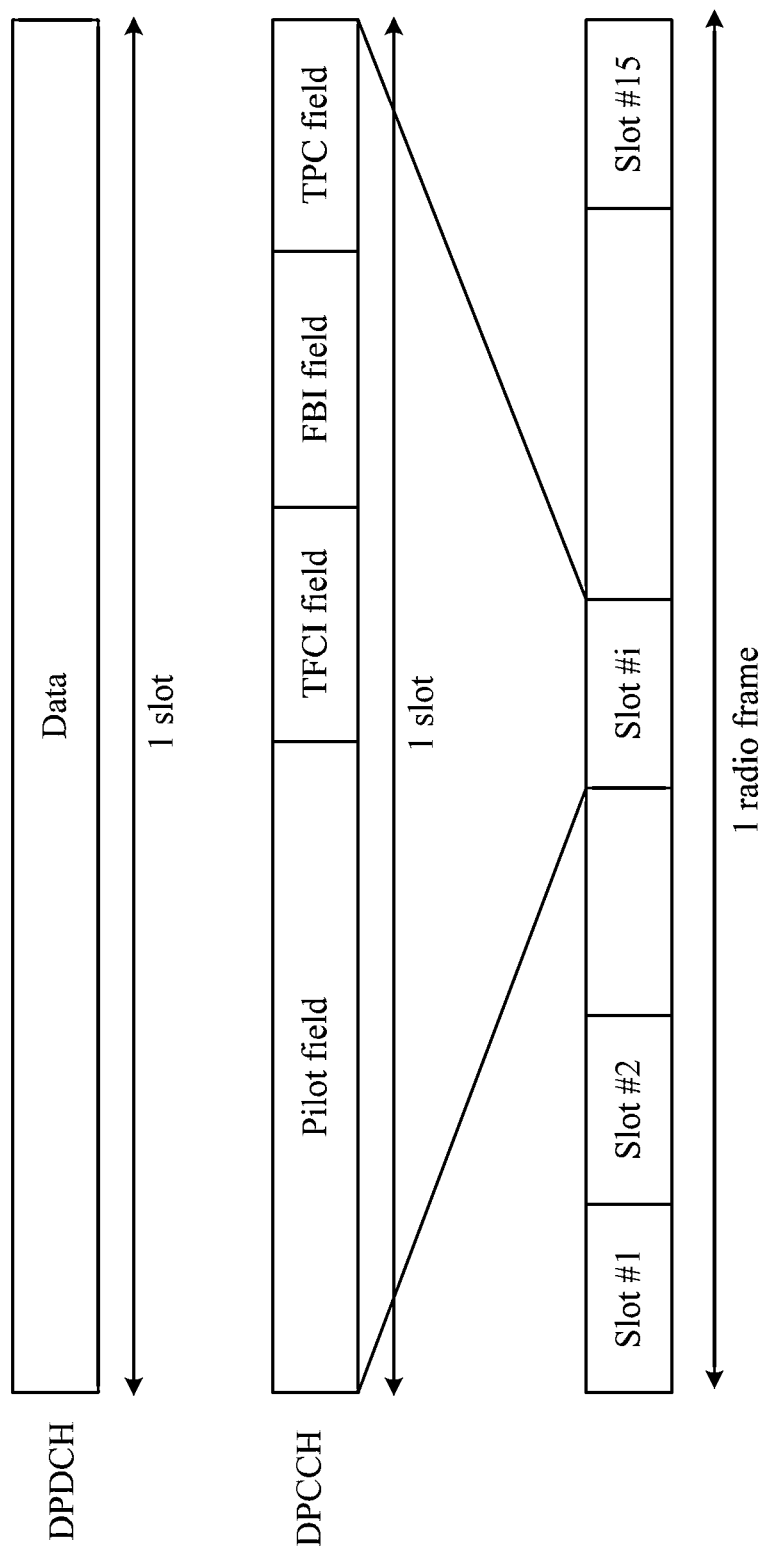
FIG. 1A is a schematic diagram of the uplink signal with 15 slots over a radio frame in accordance with the present UMTS-FDD Release 99 specification.
Figure 1B:
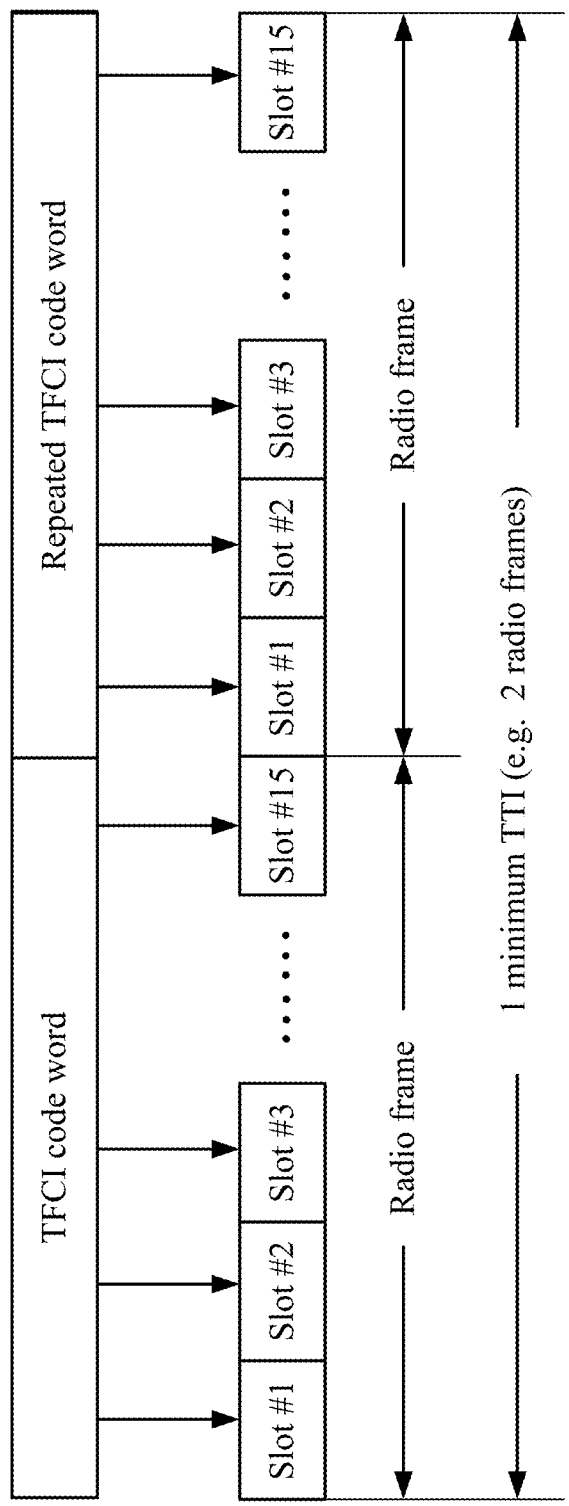
FIG. 1B is a schematic diagram showing the repeated TFCI code word in the case the minimum TTI is two radio frames.
Figure 2:
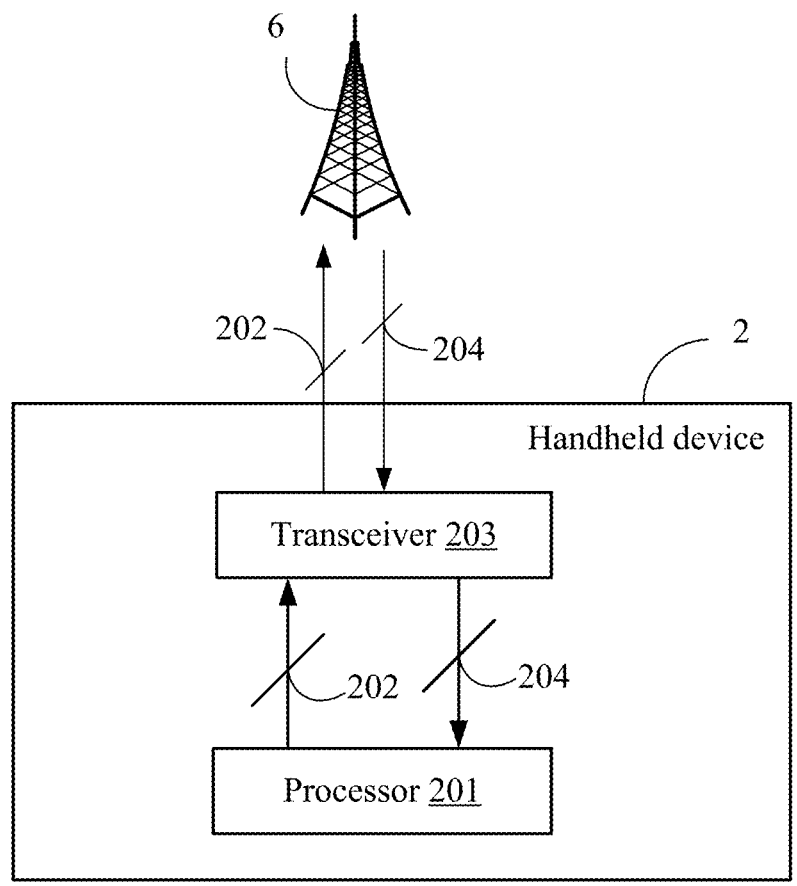
FIG. 2 is a schematic view of a handheld device 2 according to the first embodiment to the fifth embodiment of the present invention.

The first embodiment of the present invention is depicted in FIG. 2, which is a schematic diagram of a handheld device 2. The handheld device 2 communicates with a base station 6. The handheld device 2 may be a smart phone, a tablet computer, or any other device with communication capability. It shall be noted that for the purpose of simplicity, other elements of the handheld device 2, such as a display module, an antenna module, a power module and elements less related to the present invention, are all omitted from depiction herein.

Figure 3A:
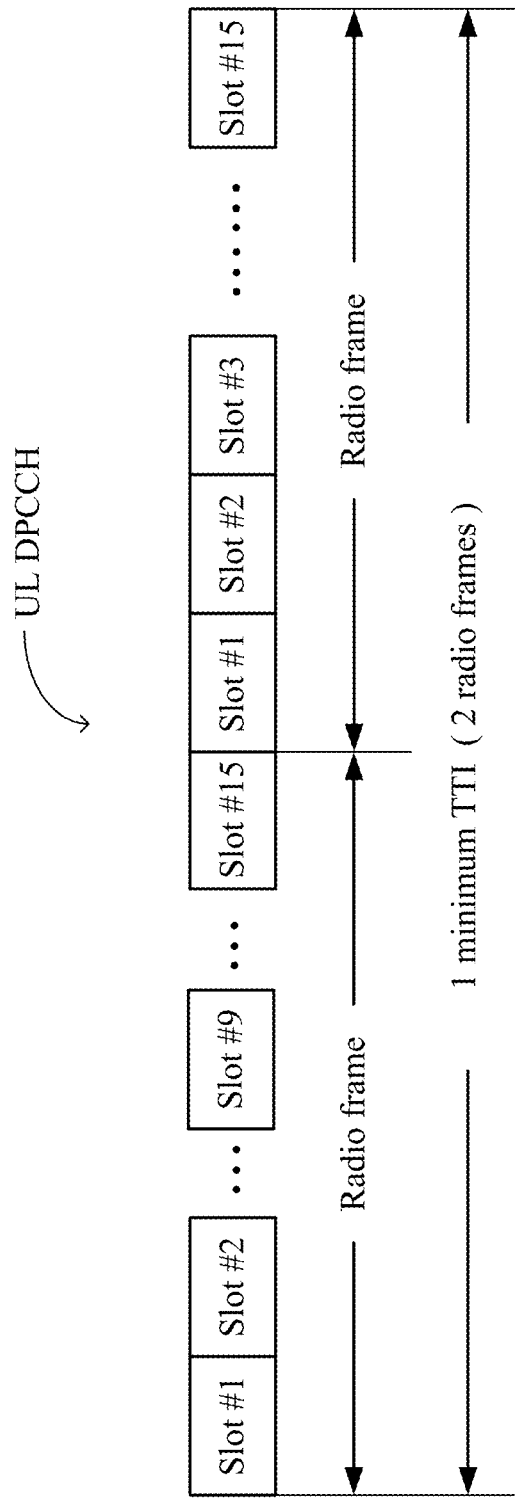
FIG. 3A is a schematic diagram showing an uplink dedicated physical control channel (UL DPCCH) of the uplink signal in the case the minimum TTI is two radio frames according to the first embodiment of the present invention.

The handheld device 2 comprises a processor 201 and a transceiver 203. The transceiver 203 is electronically connected to the processor 201. When the handheld device 2 communicates with the base station 6, the processor 201 generates an uplink signal 202 and the transceiver 203 transmits the uplink signal 202 to the base station 6 and receives a downlink signal 204 from the base station 6 simultaneously. FIG. 3A depicts an uplink dedicated physical control channel (UL DPCCH) of the uplink signal 202 within a minimum TTI (e.g. two radio frame). The UL DPCCH comprises 15 control slots (which are designated by Slot #1 to Slot #15 herein) over a radio frame. The control slots may be a non-transmission gap (non-TG) control slot or a TG control slot.

In the present invention, each non-TG control slot has three fields which includes the pilot field, the transport format combination indicator (TFCI) field and the transmit power control (TPC) field, but excludes the FBI field. The TFCI field carries 2 bits, the pilot field carries 6 bits and the TPC field carries 2 bits. Since the present invention only focuses on the information carried in the TFCI field, the pilot field and the TPC field are not further described herein.

Figure 3B:
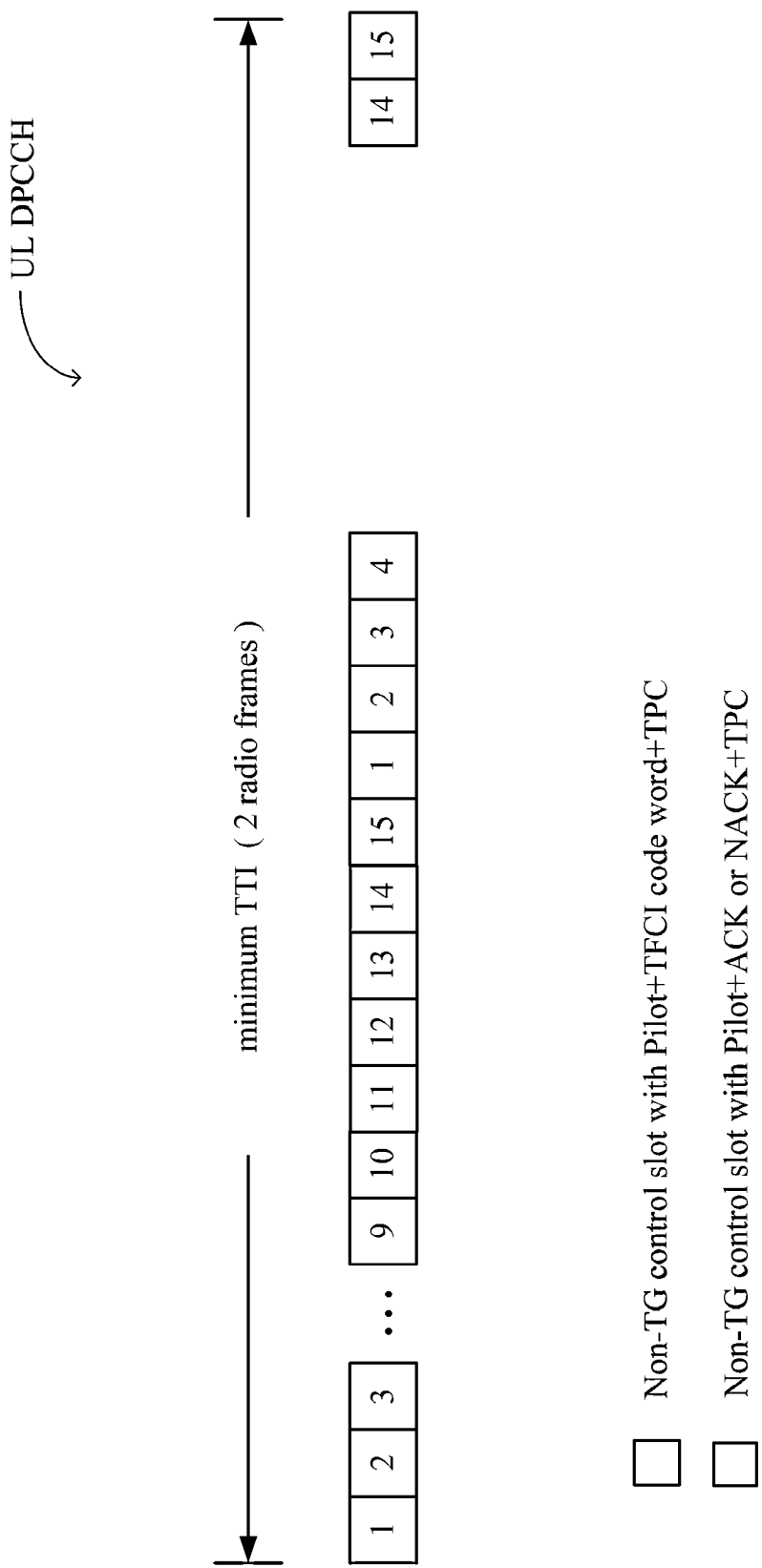
FIG. 3B is a schematic diagram showing a slot structure of the UL DPCCH in the normal mode according to the first embodiment of the present invention.

FIG. 3B depicts a slot structure of the UL DPCCH without TG control slots in the normal mode. Unlike the present UMTS-FDD release 99, in the present invention, for each minimum TTI, the TFCI fields of the first 10 non-TG control slots carry a TFCI code word and the TFCI fields of remaining non-TG control slots carry acknowledgement (ACK) information for downlink data frame early termination (FET). The TFCI code word in the present invention is a truncated 20-bit TFCI code word from a 32-bit TFCI code word corresponding to 10-bit TFCI information. For example, for each minimum TTI, the 10-bit TFCI information may be encoded with the Reed-Muller code into the 32-bit TFCI code word, and then each TFCI field of the first 10 non-TG control slots carries 2 bits of the truncated 20-bit TFCI code.

Figure 3C:
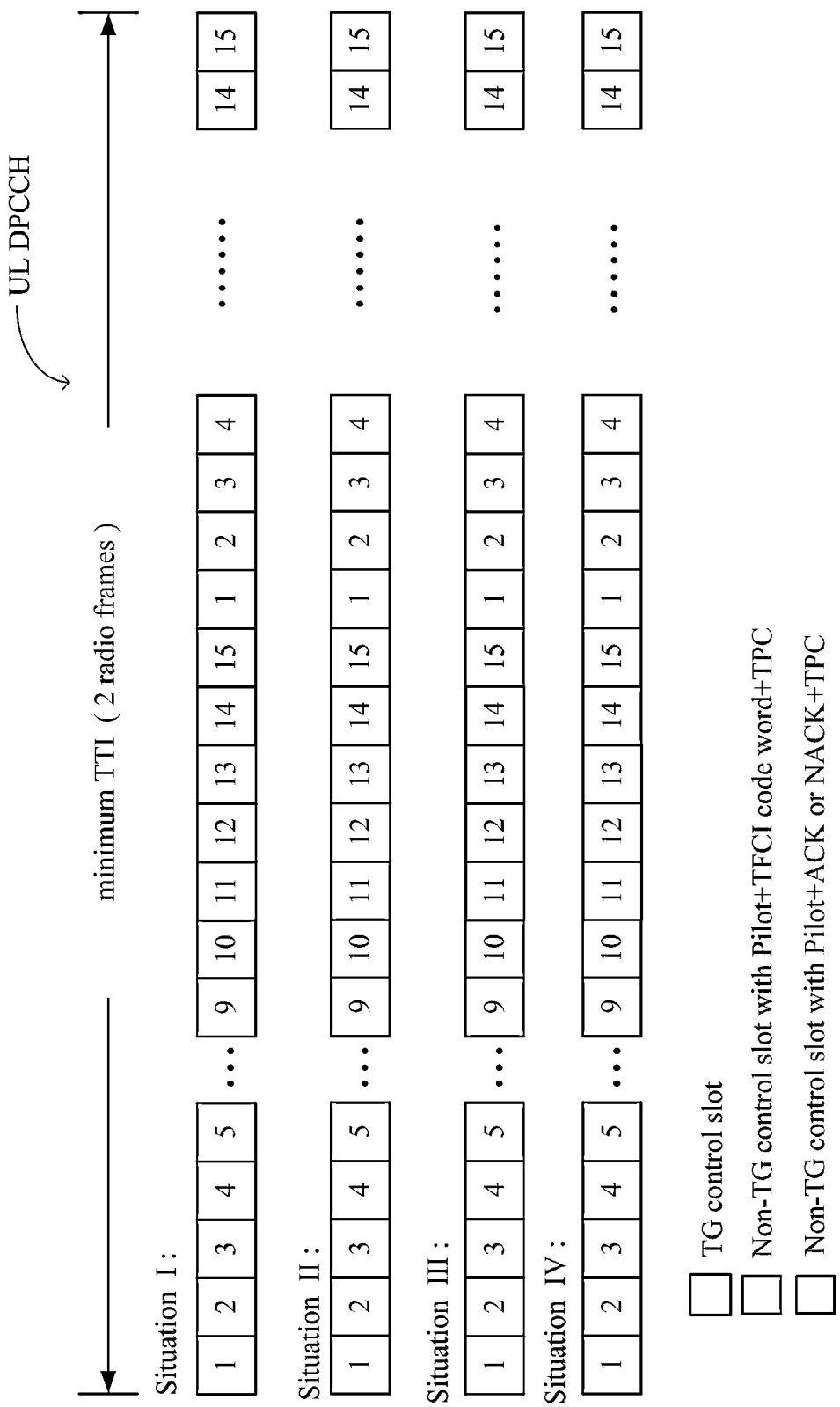
FIG. 3C is a schematic diagram showing a slot structure of the UL DPCCH with TG control slots in the compressed mode in different situations according to the first embodiment of the present invention.

In addition, FIG. 3C depicts a slot structure of the UL DPCCH with TG control slots in the compressed mode. In the compressed mode, there is a period of time corresponding to some TG control slots used for measurement purpose. In this case, the physical layer control information and the ACK information are only carried by the non-TG control slots.

For example, in FIG. 3C, the UL DPCCH has four TG control slots within a minimum TTI. Similarly, the TFCI fields of the first 10 non-TG control slots carry a TFCI code word while the TFCI fields of the remaining non-TG control slots carry ACK information for downlink data FET. FIG. 3C shows four situations in which the TG slots occur in different time. In the situations I and II, the TG slots occur after the first 10 control slots. In the situations III and IV, the TG slots occur within the first 10 control slots.

Figure 4:
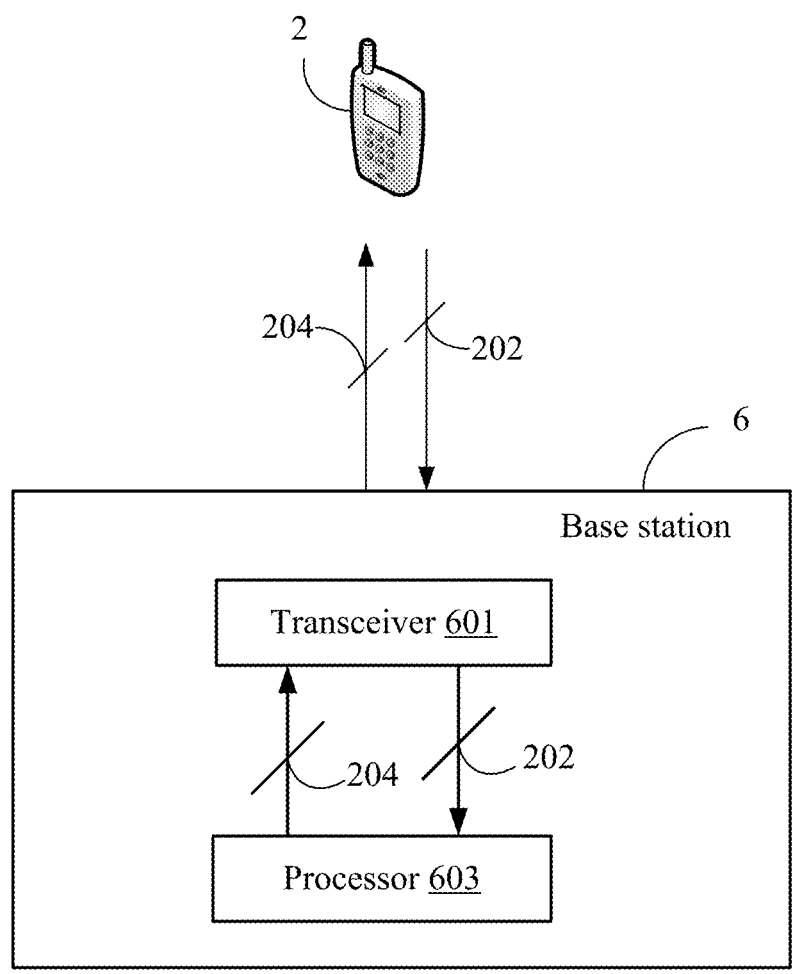
FIG. 4 is a schematic view of a base station 6 according to the first to fifth embodiments of the present invention.

FIG. 4 is a schematic diagram of the base station 6. The base station 6 comprises a transceiver 601 and a processor 603. The transceiver 601 transmits the downlink signal 204 to the handheld device 2 and receives the uplink signal 202 from the handheld device 2. The processor 603 is electrically connected to the transceiver 601 and configured to generate the downlink signal 204 and enable the transceiver 601 to terminate the transmission of the downlink data frame of the downlink signal 204 according to the ACK information. It should be appreciated that, during soft handover, each handheld device communicates with more than one base station simultaneously with the same UL DPCH. In other words, the handheld device 2 can communicate not only with the base station 6 but also with other base station simultaneously with the same UL DPCH during soft handover.

The second embodiment of the present invention is depicted in FIGS. 5A-5B. As aforementioned, for each minimum TTI, the TFCI fields of the remaining non-TG control slots of the non-TG control slots carry ACK information. The ACK information comprises a plurality of 2-bit indications. Each 2-bit indication is carried in the TFCI field of a non-TG control slot of the remaining non-TG control slots and may be an acknowledgment (ACK) indication or a negative-acknowledgment (NACK) indication based on whether the downlink data frame of the downlink signal 204 has been successfully decoded earlier. In this embodiment, the processor 201 defines a single 2-bit indication (ACK indication or NACK indication) as an ACK command. Thus, each 2-bit indications carried in a single non-TG control slot of the remaining non-TG control slots constitutes an ACK command.

Specifically, the processor 201 fills the NACK indication into every non-TG control slot in which the processor 201 has not decoded the downlink data frame of the downlink signal 204 successfully. On the contrary, the processor 201 fills the ACK indication into every non-TG control slot in which the process 201 has decoded the downlink data frame of the downlink signal 204 successfully. For example, as shown in FIG. 5A, the 2-bit NACK indications are carried in Slot #11 to Slot #13 of the first radio frame in the normal mode. In this case, the downlink data frame of the downlink signal 204 has not been successfully decoded until the time point of Slot #14 of the first radio frame. In another example as shown in FIG. 5B, the 2-bit NACK indications are carried in Slot #11 of the first radio frame and Slot #1 to Slot 2 of the second radio frame in the compressed mode. In this case, the downlink data frame of the downlink signal 204 has not been successfully decoded until the time point of Slot #3 of the second radio frame.

In other embodiments, the processor 201 may further boost a transmission power of the ACK indications so that the transmission power of the ACK indications is larger than that of the NACK indications. Due to the power enhancement in the ACK indications, the base station 6 is capable of more accurately detecting the ACK indications so that the base station 6 can terminate the transmission of the downlink data frame of the downlink signal 204 according to the ACK indications. As a result, the base station 6 can reallocate the transmission power of different downlink signals for multiple user devices and reduce the interference among the downlink signals in time.

The third embodiment of the present invention is shown in FIGS. 6A-6B. In this embodiment, the processor 201 defines two 2-bit indications (ACK indication or NACK indication) as an ACK command. Thus, every two of the 2-bit indications carried in two successive non-TG control slots of the remaining non-TG control slots constitutes an ACK command. Specifically, the processor 201 fills the NACK indications into two successive non-TG control slots in which the processor 201 has not decoded the downlink data frame of the downlink signal 204 successfully. On the contrary, the processor 201 fills the ACK indications into the two successive non-TG control slots in which the processor 201 has decoded the downlink data frame of the downlink signal 204 successfully.

For example, as shown in FIG. 6A, the 2-bit NACK indications are carried in Slot #11 to Slot #14 of the first radio frame in the normal mode. In this case, the two 2-bit NACK indications carried in Slot #11 and Slot #12 of the first radio frame is an ACK command and the two 2-bit NACK indications carried in Slot #13 and Slot #14 of the first radio frame is an ACK command. The following ACK commands are filled with two 2-bit ACK indications since the downlink data frame of the downlink signal 204 may be successfully decoded at the time point of Slot #14 or Slot #15 of the first radio frame. In other words, even the downlink data frame of the downlink signal 204 is successfully decoded at the time point of Slot #14, the processor 201 has to fill the NACK indication into Slot #14 to make the ACK command constituted by the two 2-bit NACK indications carried in Slot #13 and Slot #14 complete.

In another example as shown in FIG. 6B, the 2-bit NACK indications are carried in Slot #11 of the first radio frame and Slot #1 to Slot #3 of the second radio frame in the compressed mode. In this case, the two 2-bit NACK indications carried in Slot #11 of the first radio frame and Slot #1 of the second radio frame is an ACK command and the two 2-bit NACK indications carried in Slot #2 and Slot #3 of the second radio frame is an ACK command. The following ACK commands are filled with two 2-bit ACK indications since the downlink data frame of the downlink signal 204 may be successfully decoded at the time point of Slot #3 or Slot #4 of the second radio frame.

Figure 6C:
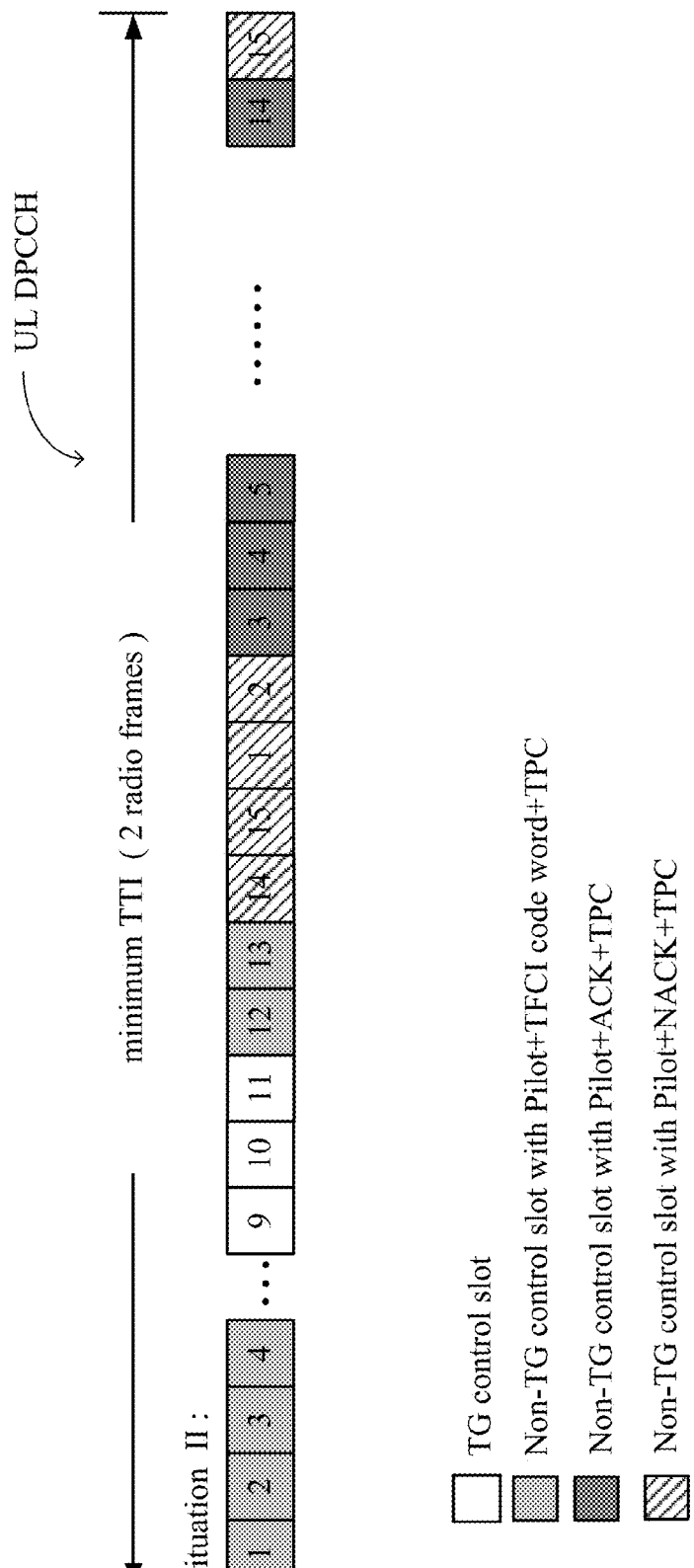
FIG. 6C is a schematic diagram showing a slot structure of the UL DPCCH with TG control slots in the compressed mode according to another embodiment of the present invention.

In another embodiment, the processor 201 may fill the NACK indication into the last non-TG control slot of the remaining non-TG slots which does not constitute an ACK command with its preceding non-TG control slot. As shown in FIG. 6C, the 2-bit NACK indications are carried in Slot #14 to Slot #15 of the first radio frame and Slot #1 to Slot #2 of the second radio frame in the compressed mode with three TG control slots. Since the two 2-bit NACK indications carried in Slot #14 and Slot #15 of the first radio frame is an ACK command and the two 2-bit NACK indications carried in Slot #1 and Slot #2 of the second radio frame is an ACK command, the downlink data frame of the downlink signal 204 may be successfully decoded at the time point of Slot #2 or Slot #3 of the second radio frame. In this case, every two 2-bit ACK indications carried in Slot #3 to Slot #14 of the second radio frame is an ACK command; therefore, the processor 201 fills a 2-bit NACK indication into Slot #15 of the second radio frame since it has no follow-up non-TG slot in the minimum TTI.

Figure 7A:
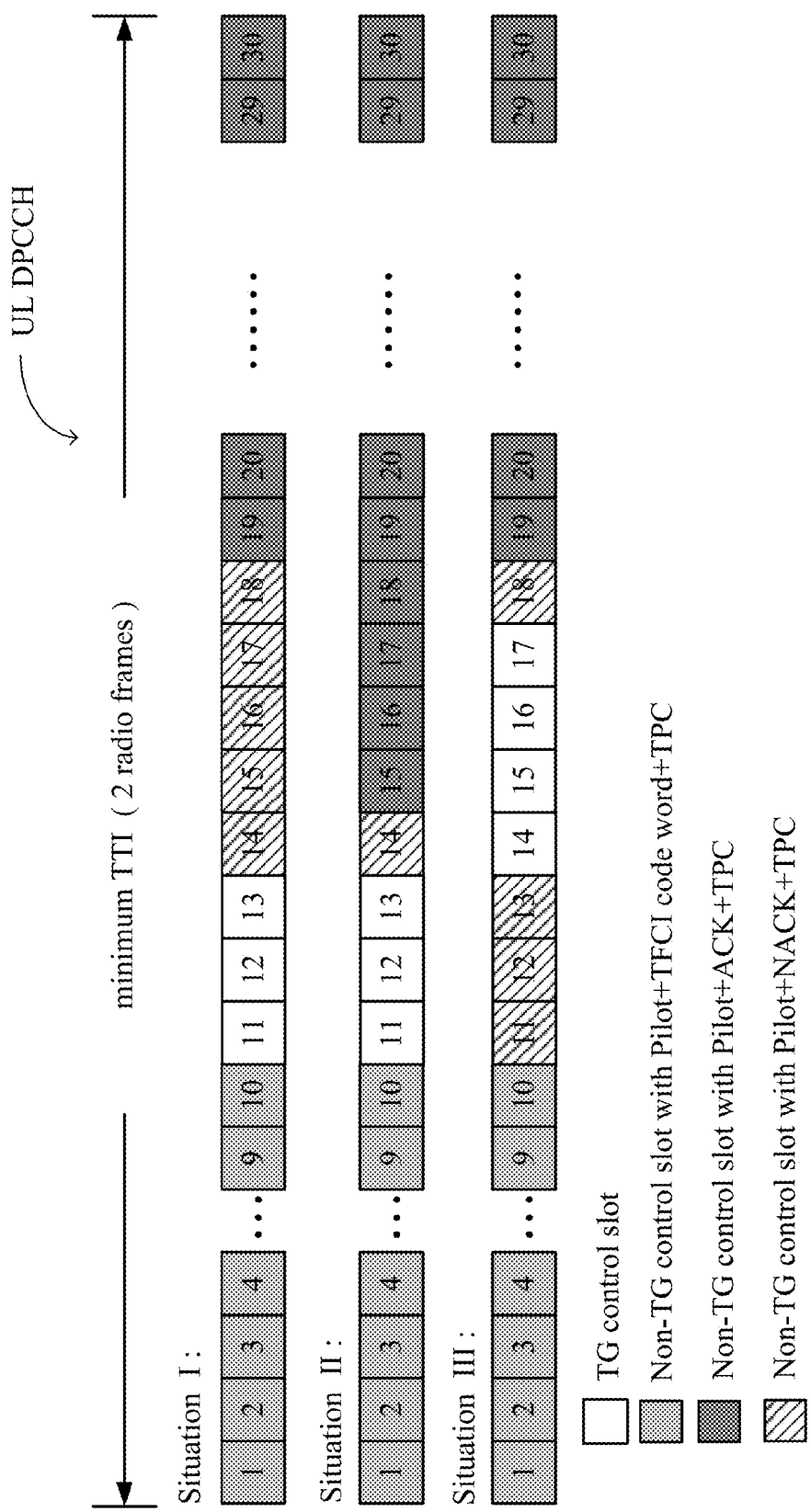
FIG. 7A is a schematic diagram showing a slot structure of the UL DPCCH with TG control slots in the compressed mode in different situations according to the fourth embodiment of the present invention.

The fourth embodiment of the present invention is shown in FIG. 7A. In this embodiment, the whole 30 control slots over two radio frame may be considered together and designated by Slot #1 to Slot #30 as shown in FIG. 7A. The processor 201 also defines two 2-bit indications (ACK indication or NACK indication) as an ACK command; however, every two of the 2-bit indications carried in two consecutive non-TG control slots (i.e. an odd-number non-TG slot and its follow-up even-numbered non-TG slot) of the remaining non-TG control slots constitutes an ACK command.

Specifically, the processor 201 fills the NACK indications into two consecutive non-TG control slots in which the processor 201 has not decoded the downlink data frame of the downlink signal 204 successfully. On the contrary, the processor 201 fills the ACK indications into the two consecutive non-TG control slots in which the processor 201 has decoded the downlink data frame of the downlink signal 204 successfully. Besides, the processor 201 further fills the NACK indication into the non-TG control slot of the remaining non-TG slots which is an even-numbered slot and without a preceding non-TG control slot of the remaining non-TG slots, or which is an odd-numbered slot and without a follow-up non-TG control slot of the remaining non-TG slots regardless of whether the downlink data frame of the downlink signal 204 has been successfully decoded earlier. As a result, the base station 6 may take the ACK command from an odd-numbered slot and its follow-up even-numbered slot.

For example, the situation I in FIG. 7A shows that a NACK indication is filled into Slot #14 since Slot #14 is an even-number slot and its preceding Slot #13 is not a non-TG control slot. Then, the NACK indications are filled into every two consecutive non-TG control slots of the remaining non-TG control slots (i.e. Slot #15 to Slot #18) until the processor 201 has decoded the downlink data frame of the downlink signal 204 successfully at the time point of Slot #19. In this case, the base station 6 can take Slot #15 and Slot #16 as an ACK command, Slot #17 and Slot #18 as an ACK command, and so on.

On the other hand, the situation II in FIG. 7A shows that a NACK indication is filled into Slot #14 since Slot #14 is an even-number slot even though the processor 201 may have decoded the downlink data frame of the downlink signal 204 successfully at the time point of Slot #14. Similarly, in this case, the base station 6 can take Slot #15 and Slot #16 as an ACK command, Slot #17 and Slot #18 as an ACK command, and so on. Furthermore, the situation III in FIG. 7A shows that a NACK indication is filled into Slot #18 since Slot #18 is an even-number slot and preceding Slot #17 is not a non-TG control slot even though the processor 201 may have decoded the downlink data frame of the downlink signal 204 successfully at the time point of Slot #18. In this case, Slot #13 is also filled with the 2-bit NACK indication since its follow-up Slot #14 is a TG control slot and is unable to be constituted an ACK command with Slot #13. In addition, the base station 6 can take Slot #11 and Slot #12 as an ACK command, Slot #19 and Slot #20 as an ACK command, and so on.

In another embodiment, the processor 201 also defines two 2-bit indications (ACK indication or NACK indication) as an ACK command and fills two 2-bit indications into two consecutive non-TG control slots by the same way as described in the fourth embodiment. However, the processor 201 in this embodiment fills a NACK indication into a non-TG control slot of the remaining non-TG slot which is an even-numbered slot and without a preceding non-TG control slot of the remaining non-TG slots and in which the processor has not decoded the downlink data frame of the downlink signal 204 successfully. In addition, the processor 201 also fills a NACK indication into a non-TG control slot of the remaining non-TG slot which is an odd-numbered slot and without a follow-up non-TG control slot of the remaining non-TG slots and in which the processor has not decoded the downlink data frame of the downlink signal 204 successfully. Conversely, the processor 201 fills an ACK indication into a non-TG control slot of the remaining non-TG slot which is an odd-numbered slot and without a follow-up non-TG control slot of the remaining non-TG slots and in which the processor has decoded the downlink data frame of the downlink signal 204 successfully.

In other words, based on whether the downlink data frame of the downlink signal 204 has been decoded successfully, the processor 201 fills an ACK or a NACK indication into a non-TG slot of the remaining non-TG slot which is an even-numbered slot and without a preceding non-TG control slot of the remaining non-TG slots, or which is an odd-numbered slot and without a follow-up non-TG control slot of the remaining non-TG slots. It should be appreciated that the base station 6 in this embodiment can also take the ACK command from an odd-numbered slot and its follow-up even-numbered slot as described in the fourth embodiment.

Figure 7B:
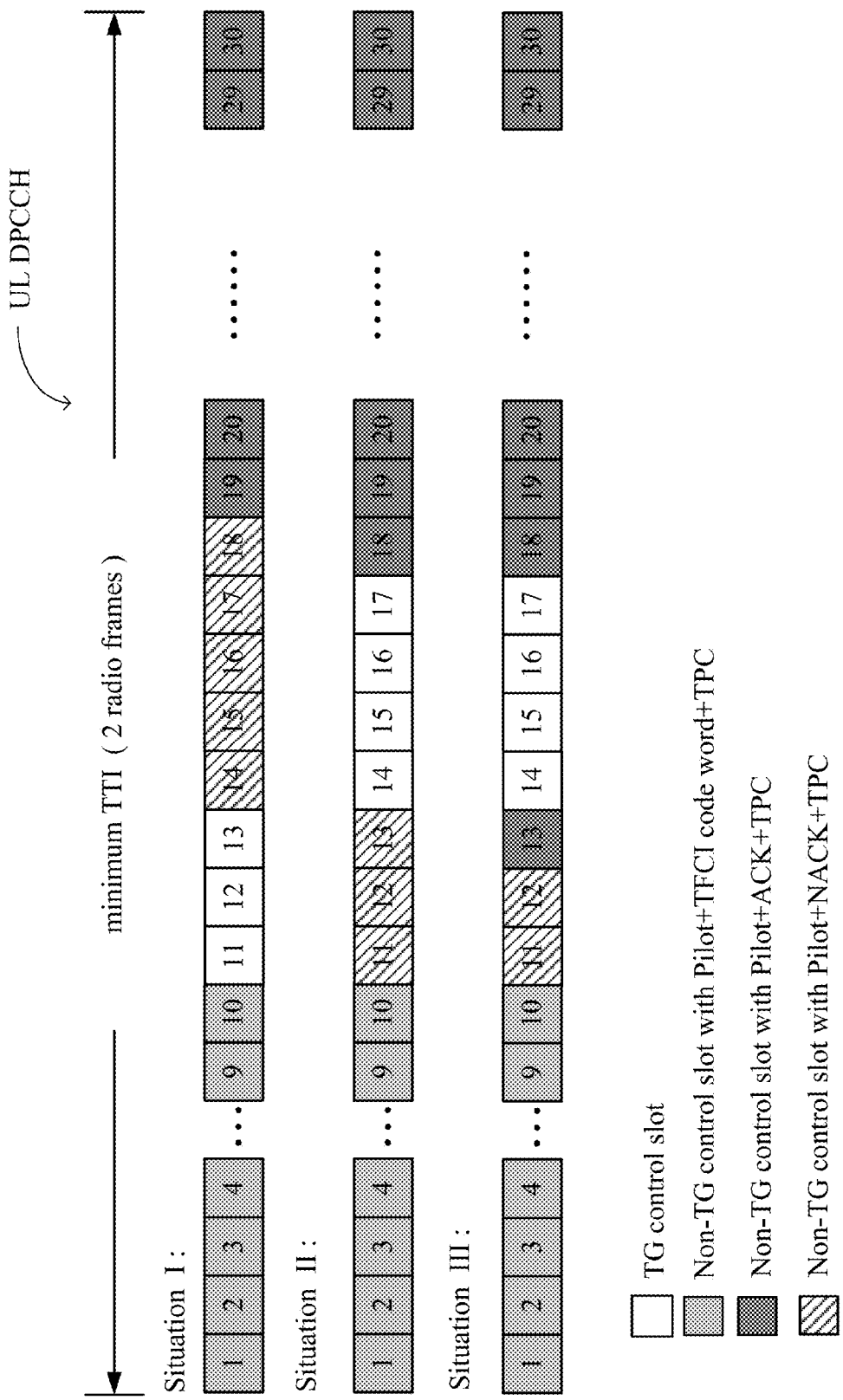
FIG. 7B is a schematic diagram showing a slot structure of the UL DPCCH with TG control slots in the compressed mode in different situations according to another embodiment of the present invention.

For example, as shown in situation I of FIG. 7B, Slot #14, which is an even-numbered slot and whose preceding slot #13 is a TG slot, is filled with a 2-bit NACK indication since the downlink data frame of downlink signal 204 has not been decoded successfully at the time point of Slot #14. In this case, since two 2-bit ACK indications carried in Slot #19 and Slot #20 is an ACK command, the downlink data frame may be successfully decoded at the time point of Slot #18 or Slot #19. In addition, the base station 6 can take the ACK command from an odd-numbered slot and its follow-up even-numbered slot (i.e., Slot #15 and Slot #16 as an ACK command, Slot #17 and Slot #18 as an ACK command, and so on).

Situation II of FIG. 7B shows that Slot #13, which is an odd-numbered slot and whose follow-up Slot #14 is a TG-slot, is filled with a 2-bit NACK indication since the downlink data frame of downlink signal 204 has not been decoded successfully at the time point of Slot #13. On the other hand, a 2-bit ACK indication is filled into Slot #18 since the downlink data frame of downlink signal 204 has been decoded successfully at the time point of Slot #18. In addition, in this case, the base station 6 can take Slot #11 and Slot #12 as an ACK command, Slot #19 and Slot #20 as an ACK command, and so on. Moreover, Situation III of FIG. 7B shows that Slot #13, which is an odd-numbered slot and whose follow-up Slot #14 is a TG-slot, is filled with a 2-bit ACK indication since the downlink data frame of downlink signal 204 has been decoded successfully at the time point of Slot #13.

Likewise, in other embodiments, the processor 201 may further boost a transmission power of the ACK indications so that the transmission power of the ACK indications is larger than that of the NACK indications. Due to the power enhancement in the ACK indications, the base station 6 is capable of more accurately detecting the ACK indications so that the base station 6 can terminate the transmission of the downlink data frame of the downlink signal 204 according to the ACK indications. As a result, the base station 6 can reallocate the transmission power of different downlink signals for multiple user devices and reduce the interference among the downlink signals in time.

Figure 8A:
FIGS. 8A-8B respectively depict two structures of the uplink dedicated physical data channel (UL DPDCH) in two different transmission types according to the fifth embodiment of the present invention.
Figure 8B:
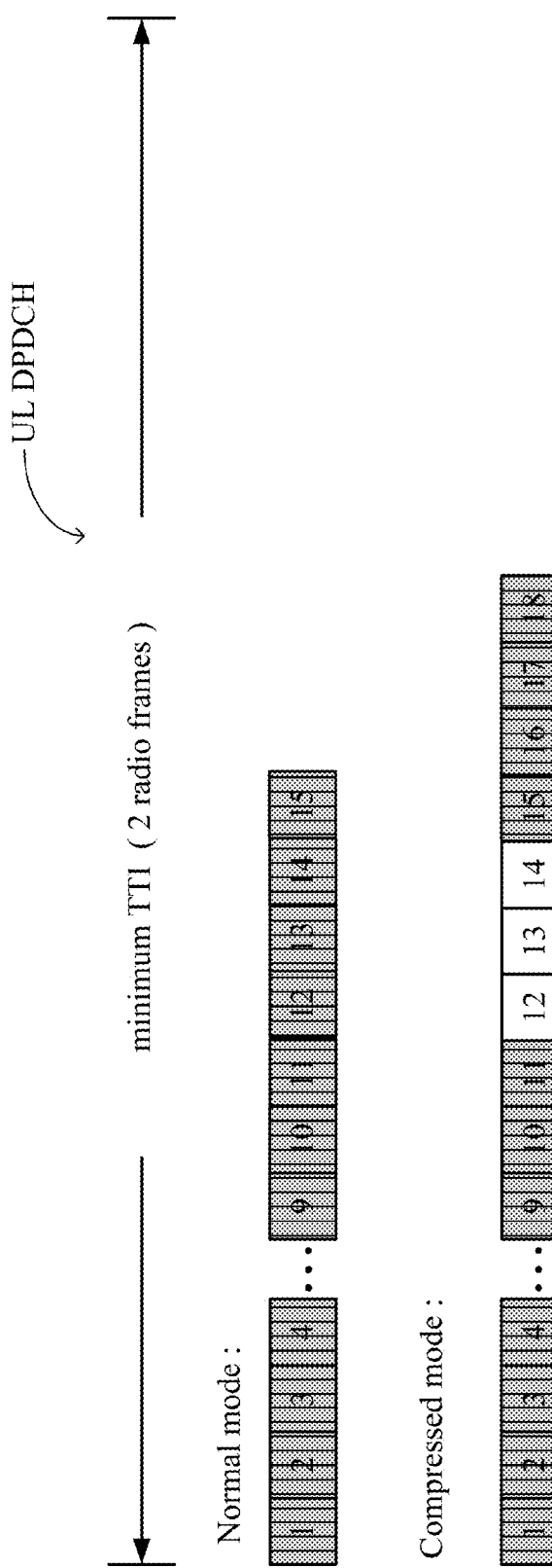

The fifth embodiment of the present invention are shown in FIG. 8A and FIG. 8B, which respectively depict two structures of the uplink dedicated physical data channel (UL DPDCH) in two different transmission types. FIG. 8A shows a first transmission type in both the normal mode and compressed mode. The structure of the UL DPDCH in the first transmission type is the same structure with 20 millisecond TTI as defined in the UMTS-FDD Release 99. In the first transmission type, the UL DPDCH comprises 30 data slots in a minimum TTI (i.e. two radio frames). The 30 data slots have a plurality of non-TG data slots and all of the non-TG data slots are used for carrying user data.

In the present invention, the processor 201 generates the uplink signal 202 according to the first transmission type so that the UL DPDCH of the uplink signal 202 may be illustrated as shown in FIG. 8A and the UL DPCCH of the uplink signal 202 may be illustrated as shown in FIGS. 3A-3C, FIGS. 5A-5B, FIGS. 6A-6B or FIG. 7. Since a person having ordinary skill in this art will easily appreciate how the processor 201 generates the uplink signal 202 with the UL DPDCH and the UL DPCCH based on the above embodiments, the detail will not be further described herein.

In other embodiments, the processor 201 may generate a radio resource control (RRC) message indicating the first transmission type. The transceiver 203 transmits the RRC message to the base station 6 in an initial connection establishment procedure. Furthermore, in other embodiments, the TFCI code word on the UL DPCCH may further have indication information indicating the first transmission type. Accordingly, the base station 6 can be informed of the first transmission type via the RRC message or the TFCI code word.

In other embodiments, the processor 201 may further select the first transmission type from the first transmission type and the second transmission type to generate the uplink signal 202. Specifically, the second transmission type shown in FIG. 8B only uses the first 15 non-TG data slots of 30 data slots within the 20 millisecond TTI to carry user data. In normal mode, the transmission power of the first 15 non-TG data slots in the second transmission type is larger than the transmission power of the non-TG data slots in the first transmission type. Thus, in some situations (e.g. an uplink power limited situation or a function limited situation to the handheld device 2), the processor 201 may select the first transmission type rather than the second transmission type.

Figure 9:
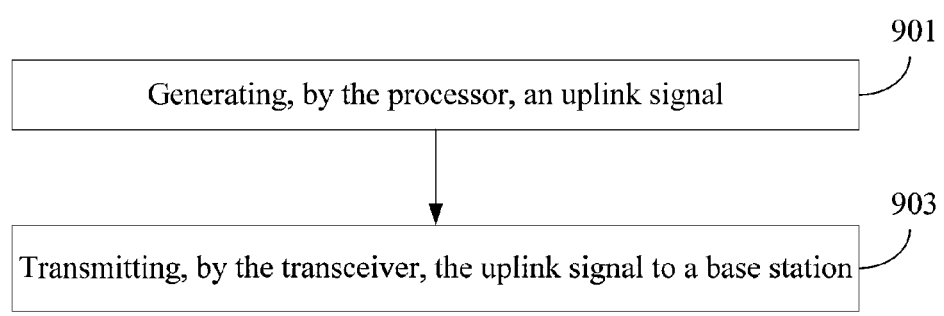
FIG. 9 is a flowchart diagram of a transmission control method according to the sixth embodiment of the present invention.

The sixth embodiment of the present invention is a transmission control method, a flowchart diagram of which is shown in FIG. 9. The transmission control method is for use in a handheld device, e.g., the handheld device 2 of the first to sixth embodiments. The handheld device comprises a processor and a transceiver. The transceiver is electrically connected to the processor.

First, step 901 is executed by the processor to generate an uplink signal. The uplink signal has an uplink dedicated physical control channel (UL DPCCH). The UL DPCCH comprises a plurality of non-transmission gap (non-TG) control slots. Each of the non-TG control slots has a transport format combination indicator (TFCI) field. For each minimum TTI, the TFCI fields of the first 10 non-TG control slots of the non-TG control slots carry a TFCI code word while the TFCI fields of the remaining non-TG control slots of the non-TG control slots carry acknowledgement (ACK) information for downlink data frame early termination. Afterwards, step 903 is executed by the transceiver of the handheld device to transmit the uplink signal to a base station.

In other embodiments, as aforementioned, the ACK information comprises a plurality of 2-bit indications. Each of the 2-bit indication is carried in a non-TG control slot of the remaining non-TG control slots, and each of the 2-bit indication is either an ACK indication or a negative-acknowledgment (NACK) indication. In the case that each 2-bit indications carried in a single non-TG control slot constitutes an ACK command, step 901 may further comprise the steps of filling the NACK indication into a non-TG control slot in which the processor has not decoded a downlink data frame successfully; and filling the ACK indication into a non-TG control slot in which the process has decoded the downlink data frame successfully.

In other embodiments, every two of the 2-bit indications carried in two successive non-TG control slots of the remaining non-TG control slots constitutes an ACK command. In such a case, step 901 may further comprise the steps of filling the NACK indications into the two successive non-TG control slots in which a downlink data frame has not been decoded successfully and filling the ACK indications into the two successive non-TG control slots in which the downlink data frame has been decoded successfully.

In other embodiments, every two of the 2-bit indications carried in two consecutive non-TG control slots of the remaining non-TG control slots constitutes an ACK command. In such a case, step 901 may further comprise the steps of filling the NACK indications into the two consecutive non-TG control slots in which a downlink data frame has not been decoded successfully; filling the ACK indications into the two consecutive non-TG control slots in which the downlink data frame has been decoded successfully; filling the NACK indication into a non-TG control slot which is an odd-numbered slot and without a follow-up non TG-control slot; and filling the NACK indication into a non-TG control slot of the remaining non-TG slot which is an even-numbered slot and without a preceding non-TG control slot of the remaining non-TG slot.

In another embodiment, every two of the 2-bit indications carried in two consecutive non-TG control slots of the remaining non-TG control slots constitutes an ACK command. In such a case, step 901 may further comprise the following steps: filling the NACK indication into the two consecutive non-TG control slots in which a downlink data frame has not been decoded successfully; filling the ACK indication into the two consecutive non-TG control slots in which the downlink data frame has been decoded successfully; filling the NACK indication into a non-TG control slot which is an odd-numbered slot and without a follow-up non TG-control slot and in which the downlink data frame has not been decoded successfully; filling the ACK indication into the non-TG control slot which is an odd-numbered slot and without the follow-up non TG-control slot and in which the downlink data frame has been decoded successfully; filling the NACK indication into a non-TG control slot of the remaining non-TG slot which is an even-numbered slot and without a preceding non-TG control slot of the remaining non-TG slots and in which the downlink data frame has not been decoded successfully; and filling the ACK indication into a non-TG control slot of the remaining non-TG slot which is an even-numbered slot and without a preceding non-TG control slot of the remaining non-TG slots and in which the downlink data frame has been decoded successfully.

In other embodiments, step 901 may further comprise the following steps: generating the uplink signal according to a transmission type. The uplink signal further has an uplink dedicated physical data channel (UL DPDCH). The UL DPDCH comprises 30 data slots over two radio frames. The 30 data slots include a plurality of non-TG data slots, and each of the non-TG data slots of the 30 data slots carries user data.

Moreover, in other embodiments, the transmission control method of the present invention may further comprise the following steps: the processor generates a radio resource control (RRC) message indicating the transmission type; and the transceiver transmits the RRC message to the base station in an initial connection establishment procedure.

Instead of using the RRC message to indicate the transmission type, in another embodiment, the TFCI code word may have indication information to indicate the transmission type. And, in another embodiments, the transmission control method of the present invention may further comprise the step in which the processor selects the transmission type from two transmission types to generate the uplink signal.

In addition to the aforesaid steps, the transmission control method of the present invention can also execute all the operations and corresponding functions set forth in the first to fifth embodiment. How to execute these operations and functions will be readily appreciated by those of ordinary skill in the art based on the explanation of the first to fourth embodiments, and thus, will not be further described herein.

Figure 10:
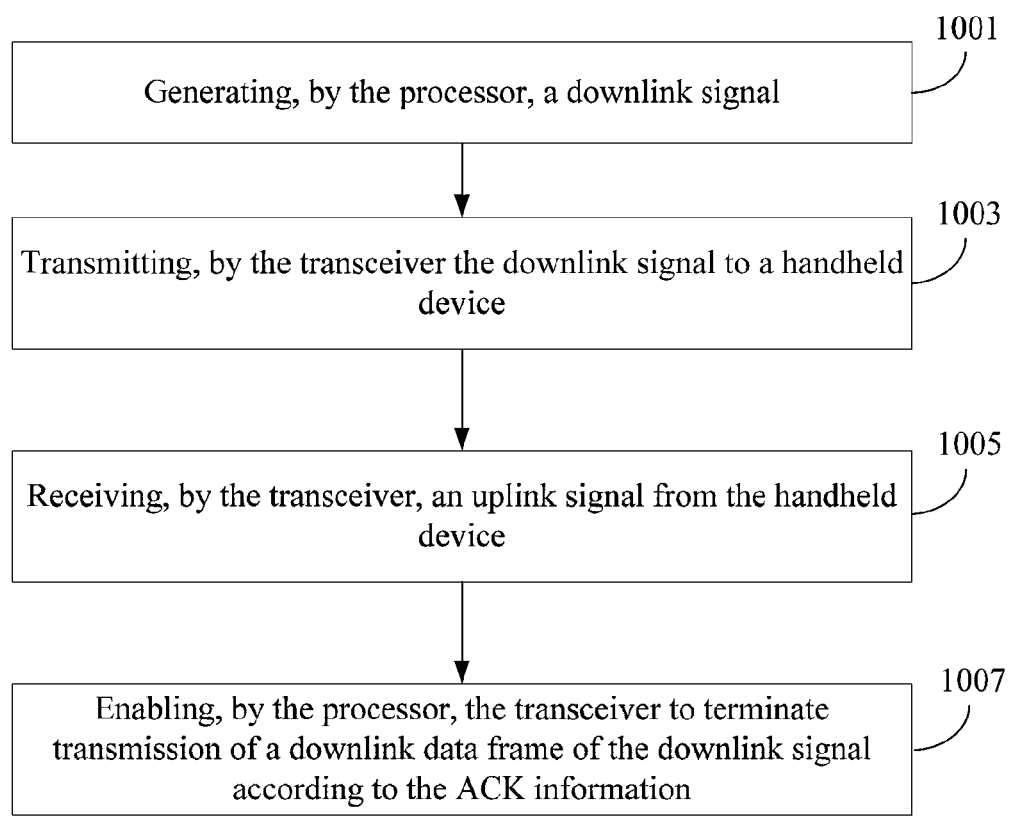
FIG. 10 is a flowchart diagram of a transmission control method according to the seventh embodiment of the present invention.

The seventh embodiment of the present invention is a transmission control method, a flowchart diagram of which is shown in FIG. 10. The transmission control method is for use in a base station, e.g., the base station 6 of the first to fifth embodiments. The base station comprises a transceiver and a processor. The transceiver is electrically connected to the processor. First, step 1001 is executed by the processor to generate a downlink signal. Then, step 1003 is executed by the transceiver to transmit the downlink signal to a handheld device.

Next, step 1005 is executed by the transceiver to receive an uplink signal from the handheld device. The uplink signal has an uplink dedicated physical control channel (UL DPCCH). The UL DPCCH comprises a plurality of non-transmission control gap (non-TG) slots. Each of the non-TG control slots has a transport format combination indicator (TFCI) field. For each minimum TTI, the TFCI fields of the first 10 non-TG control slots of the non-TG control slots carry a TFCI code word and the TFCI fields of the remaining non-TG control slots of the non-TG control slots carry acknowledgement (ACK) information for downlink data frame early termination. Thereafter, step 1407 is executed by the processor to enable the transceiver to terminate the transmission of a downlink data frame of the downlink signal according to the ACK information.

In other embodiments, the transmission control method of the present invention may further comprise the following steps in which the transceiver receives a radio resource control (RRC) message indicating the transmission type from the handheld device in an initial connection establishment procedure. Instead of using the RRC message to indicate the transmission type, in another embodiment, the TFCI code word may have the indication information indicate the transmission type. As set forth in the sixth embodiments, the handheld device generates the uplink signal based on the transmission type and the transmission type may be selected from two transmission types.

In addition to the aforesaid steps, the transmission control method of the present invention can also execute all the operations and corresponding functions set forth in the first to fifth embodiments. How to execute these operations and functions will be readily appreciated by those of ordinary skill in the art based on the explanation of the first to fifth embodiments, and thus, will not be further described herein.

According to the above descriptions, the transmission control mechanism of the present invention can achieve the downlink data frame early termination (FET) in time by carrying the ACK information in the TFCI fields of the non-TG control slots of the uplink signal. As a result, the base station can terminate the transmission of the downlink data frame of the downlink signal to the handheld device and reallocate the transmission power of different downlink signals for multiple user devices and reduce the interference among the downlink signals.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A handheld device comprising:
   a processor, being configured to generate an uplink signal; and
   a transceiver, being electrically connected to the processor and configured to transmit the uplink signal to a base station;
   wherein the uplink signal has an uplink dedicated physical control channel (UL DPCCH), the UL DPCCH comprises a plurality of non-transmission gap (non-TG) control slots in a minimum transmission time interval (TTI), each of the non-TG control slots has a transport format combination indicator (TFCI) field, and the TFCI fields of first 10 non-TG control slots of the non-TG control slots carry a TFCI code word and the TFCI fields of remaining non-TG control slots of the non-TG control slots carry acknowledgement (ACK) information for downlink data frame early termination.

2. The handheld device as claimed in claim 1, wherein each of the TFCI field of non-TG control slots carries 2 bits, and each of non-TG control slots further has a pilot field carrying 6 bits and a transmit power control field carrying 2 bits.

3. The handheld device as claimed in claim 2, wherein the TFCI code word is a truncated 20-bit TFCI code word from a 32-bit TFCI code word corresponding to a 10-bit TFCI information, and in each minimum TTI, each of the TFCI field of the first 10 non-TG control slots carries 2 bits of the truncated 20-bit TFCI code.

4. The handheld device as claimed in claim 2, wherein the ACK information comprises a plurality of 2-bit indications, each of the 2-bit indication is carried in a non-TG control slot of the remaining non-TG control slots, and each of the 2-bit indication is one of an acknowledgement (ACK) indication and a negative-acknowledgment (NACK) indication.

5. The handheld device as claimed in claim 4, wherein every two of the 2-bit indications carried in two successive non-TG control slots of the remaining non-TG control slots constitutes an ACK command, and the processor fills the NACK indication into the two successive non-TG control slots in which the processor has not decoded a downlink data frame successfully and fills the ACK indication into the two successive non-TG control slots in which the process has decoded the downlink data frame successfully.

6. The handheld device as claimed in claim 4, wherein every two of the 2-bit indications carried in two consecutive non-TG control slots of the remaining non-TG control slots constitutes an ACK command, the processor fills the NACK indication into the two consecutive non-TG control slots in which the processor has not decoded a downlink data frame successfully, fills the ACK indication into the two consecutive non-TG control slots in which the process has decoded the downlink data frame successfully, fills the NACK indication into a non-TG control slot which is an odd-numbered slot and without a follow-up non TG-control slot and fills the NACK indication into a non-TG control slot of the remaining non-TG slot which is an even-numbered slot and without a preceding non-TG control slot of the remaining non-TG slots.

7. The handheld device as claimed in claim 4, wherein every two of the 2-bit indications carried in two consecutive non-TG control slots of the remaining non-TG control slots constitutes an ACK command, the processor fills the NACK indication into the two consecutive non-TG control slots in which the processor has not decoded a downlink data frame successfully, fills the ACK indication into the two consecutive non-TG control slots in which the process has decoded the downlink data frame successfully, and fills the NACK indication into the non-TG control slot which is an odd-numbered slot and without the follow-up non TG-control slot and in which the processor has not decoded the downlink data frame successfully, fills the ACK indication into a non-TG control slot which is an odd-numbered slot and without a follow-up non TG-control slot and in which the processor has decoded the downlink data frame successfully, and fills the NACK indication into a non-TG control slot of the remaining non-TG slot which is an even-numbered slot and without a preceding non-TG control slot of the remaining non-TG slots and in which the processor has not decoded a downlink data frame successfully.

8. A transmission control method for use in a handheld device, the handheld device comprising a processor and a transceiver, the transceiver being electrically connected to the processor, the transmission control method comprising the following steps:
   generating, by the processor, an uplink signal; and
   transmitting, by the transceiver, the uplink signal to a base station;
   wherein the uplink signal has an uplink dedicated physical control channel (UL DPCCH), the UL DPCCH comprises a plurality of non-transmission gap (non-TG) control slots in a minimum transmission time interval (TTI), each of the non-TG control slots has a transport format combination indicator (TFCI) field, and the TFCI fields of first 10 non-TG control slots of the non-TG control slots carry a TFCI code word and the TFCI fields of remaining non-TG control slots of the non-TG control slots carry acknowledgement (ACK) information for downlink data frame early termination.

9. The transmission control method as claimed in claim 8, wherein each of the TFCI field of non-TG control slots carries 2 bits, and each of non-TG control slots further has a pilot field carrying 6 bits and a transmit power control field carrying 2 bits.

10. The transmission control method as claimed in claim 9, wherein the TFCI code word is a truncated 20-bit TFCI code word from a 32-bit TFCI code word corresponding to a 10-bit TFCI information, and for each minimum TTI, each of the TFCI field of the first 10 non-TG control slots carries 2 bits of the truncated 20-bit TFCI code.

11. The transmission control method as claimed in claim 8, wherein the ACK information comprises a plurality of 2-bit indications, each of the 2-bit indication is carried in a non-TG control slot of the remaining non-TG control slots, and each of the 2-bit indication is one of an ACK indication and a negative-acknowledgment (NACK) indication.

12. The transmission control method as claimed in claim 11, wherein every two of the 2-bit indications carried in two successive non-TG control slots of the remaining non-TG control slots constitutes an ACK command and the transmission control method further comprises the following steps:
   filling, by the processor, the NACK indication into the two successive non-TG control slots in which a downlink data frame has not been decoded successfully; and
   filling, by the processor, the ACK indication into the two successive non-TG control slots in which the downlink data frame has been decoded successfully.

13. The transmission control method as claimed in claim 11, wherein every two of the 2-bit indications carried in two consecutive non-TG control slots of the remaining non-TG control slots constitutes an ACK command and the transmission control method further comprises the following steps:
  filling, by the processor, the NACK indication into the two consecutive non-TG control slots in which a downlink data frame has not been decoded successfully;
  filling, by the processor, the ACK indication into the two consecutive non-TG control slots in which the downlink data frame has been decoded successfully;
  filling the NACK indication into a non-TG control slot which is an odd-numbered slot and without a follow-up non TG-control slot; and
  filling, by the processor, the NACK indication into a non-TG control slot of the remaining non-TG slot which is an even-numbered slot and without a preceding non-TG control slot of the remaining non-TG slots.

14. The transmission control method as claimed in claim 11, wherein every two of the 2-bit indications carried in two consecutive non-TG control slots of the remaining non-TG control slots constitutes an ACK command and the transmission control method further comprises the following steps:
  filling, by the processor, the NACK indication into the two consecutive non-TG control slots in which a downlink data frame has not been decoded successfully;
  filling, by the processor, the ACK indication into the two consecutive non-TG control slots in which the downlink data frame has been decoded successfully;
  filling, by the processor, the NACK indication into a non-TG control slot which is an odd-numbered slot and without a follow-up non TG-control slot and in which the downlink data frame has not been decoded successfully; and
  filling, by the processor, the ACK indication into the non-TG control slot which is an odd-numbered slot and without the follow-up non TG-control slot and in which the downlink data frame has been decoded successfully; and
  filling, by the processor, the NACK indication into a non-TG control slot of the remaining non-TG slot which is an even-numbered slot and without a preceding non-TG control slot of the remaining non-TG slots and in which the downlink data frame has not been decoded successfully.

15. A base station comprising:
  a transceiver, being configured to transmit a downlink signal to a handheld device and receive an uplink signal from the handheld device, wherein the uplink signal has an uplink dedicated physical control channel (UL DPCCH), the UL DPCCH comprises a plurality of non-transmission gap (non-TG) control slots in a minimum transmission time interval (TTI), each of the non-TG control slots has a transport format combination indicator (TFCI) field, and the TFCI fields of first 10 non-TG control slots of the non-TG control slots carry a TFCI code word and the TFCI fields of remaining non-TG control slots of the non-TG control slots carry acknowledgement (ACK) information for downlink data frame early termination; and
  a processor, being electrically connected to the transceiver and configured to generate the downlink signal and enable the transceiver to terminate transmission of a downlink data frame of the downlink signal according to the ACK information.

16. The base station as claimed in claim 15, wherein each of the TFCI field of non-TG control slots carries 2 bits, and each of non-TG control slots further has a pilot field carrying 6 bits and a transmit power control field carrying 2 bits.

17. The base station as claimed in claim 16, wherein the TFCI code word is a truncated 20-bit TFCI code word from a 32-bit TFCI code word corresponding to a 10-bit TFCI information, and each of the TFCI field of the first 10 non-TG control slots carries 2 bits of the truncated 20-bit TFCI code.

18. A transmission control method for use in a base station, the base station comprising a transceiver and a processor, the transceiver being electrically connected to the processor, the transmission control method comprising the following steps:
  generating, by the processor, a downlink signal;
  transmitting, by the transceiver, a downlink signal to a handheld device;
  receiving, by the transceiver, an uplink signal from the handheld device, wherein the uplink signal has an uplink dedicated physical control channel (UL DPCCH), the UL DPCCH comprises a plurality of non-transmission control gap (non-TG) slots in a minimum transmission time interval (TTI), each of the non-TG control slots has a transport format combination indicator (TFCI) field, and the TFCI fields of first 10 non-TG control slots of the non-TG control slots carry a TFCI code word and the TFCI fields of remaining non-TG control slots of the non-TG control slots carry acknowledgement (ACK) information for downlink data frame early termination; and
  enabling, by the processor, the transceiver to terminate transmission of a downlink data frame of the downlink signal according to the ACK information.

19. The transmission control method as claimed in claim 18, wherein each of the TFCI field of non-TG control slots carries 2 bits, and each of non-TG control slots further has a pilot field carrying 6 bits and a transmit power control field carrying 2 bits.

20. The transmission control method as claimed in claim 19, wherein the TFCI code word is a truncated 20-bit TFCI code word from a 32-bit TFCI code word corresponding to a 10-bit TFCI information, and each of the TFCI field of the first 10 non-TG control slots carries 2 bits of the truncated 20-bit TFCI code.

* * * * *